Patented Mar. 19, 1946

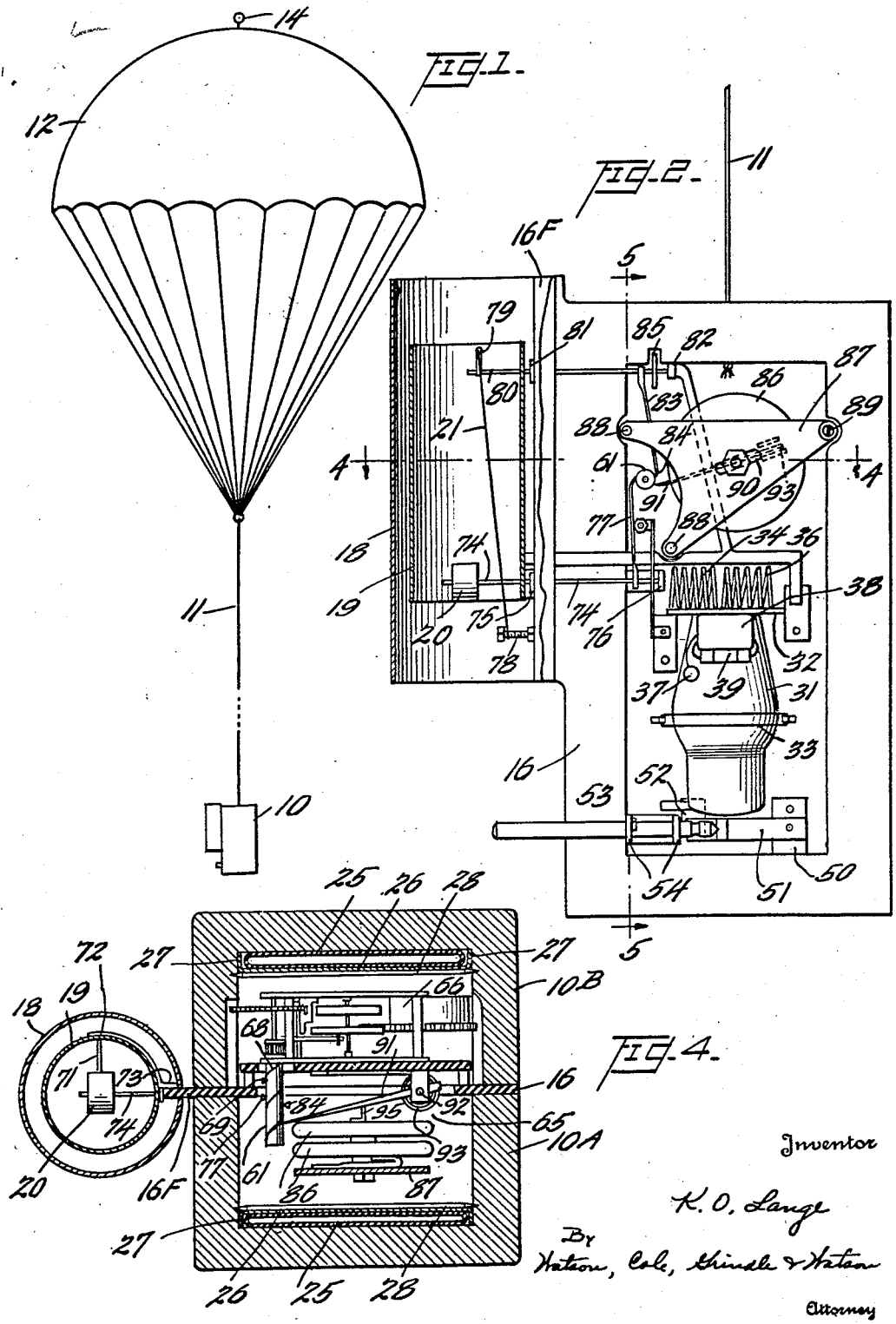

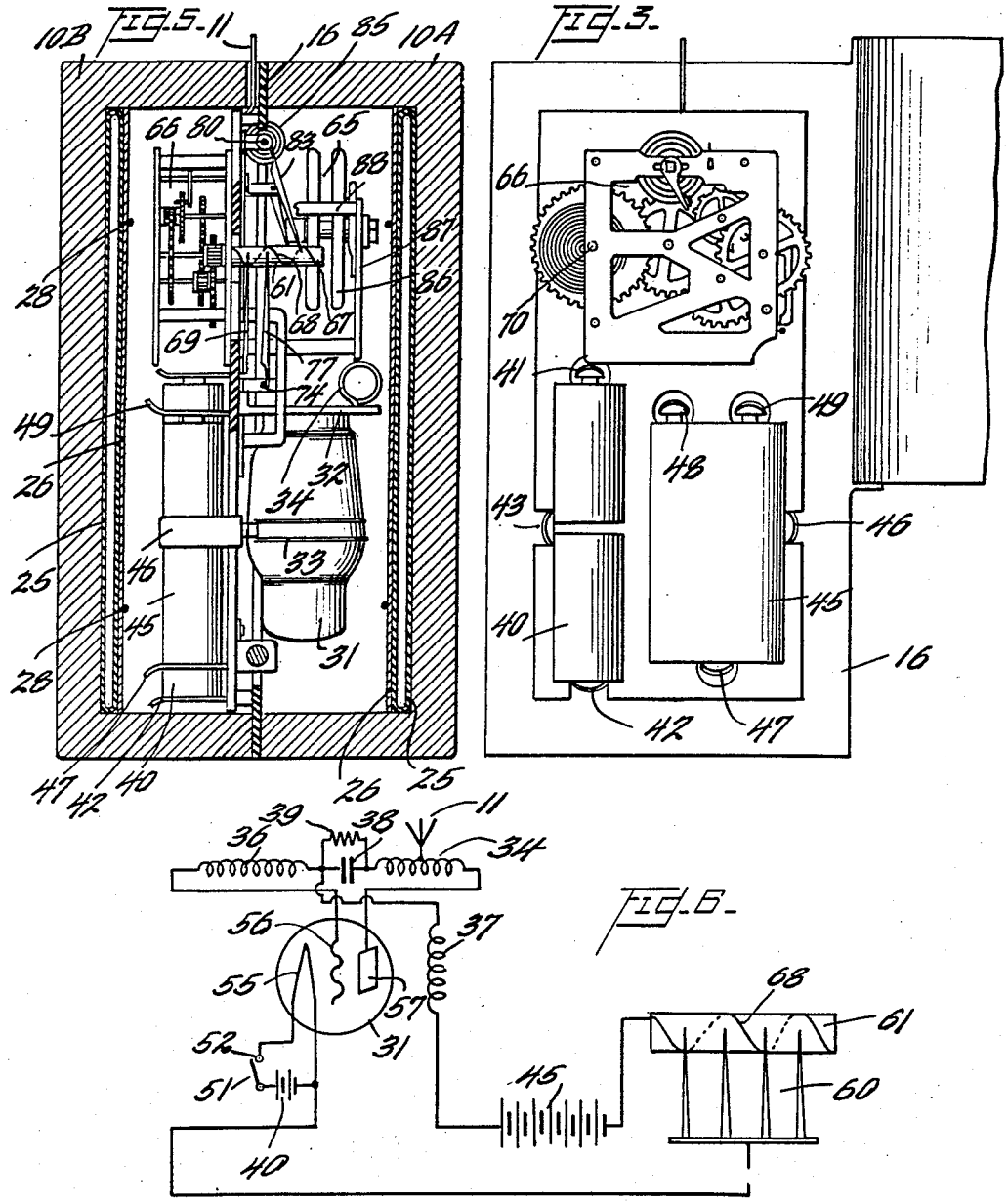

2,396,955

UNITED STATES PATENT OFFICE 2,396,955

RADIOSONDE

Karl O. Lange, Newton, Mass.

Application September 18, 1942, Serial No. 458,913

9 Claims. (Cl. 177—380)

This invention relates to apparatus for radio-meteorography and particularly to novel equipment for suspension from a free balloon and provided with meteorological instruments, a radio transmitter, and associating means, the whole assembly of which is hereinafter termed a radiosonde.

It is a general object of the present invention to provide a novel and improved radiosonde.

More particularly it is an object of the invention to provide a simplified radiosonde materially reduced in cost, size, weight, and number of parts, and increased in ruggedness, accuracy, and in protection for the various temperature-sensitive parts and accessories.

An important object of the invention consists in the novel and simple arrangements for housing, insulating, and protecting the apparatus from cold, heat, mechanical damage, and wind.

Another important object of the invention resides in the novel constructional features of the apparatus and its housing for simplified assembly, adequate protection to delicate equipment, and proper exposure of the measuring instruments either for normal operation and/or testing and calibration.

An important feature of the invention resides in the assembly and arrangement of the several meteorological instruments each with a contactor pointer movable about a fixed axis and all arranged for cooperation with a single time-controlled, rotatable contact helix whereby to facilitate assembly, initial adjustment, and final calibration.

Another important feature of the invention consists in the combination of a heat insulating housing for the apparatus together with heat radiating and reflecting means adapted to maintain the internal temperature at a point not substantially below freezing during the major portion of the flight of the equipment.

A further important feature of the invention resides in the use and construction of a contact element comprising a spiral or helix of conducting material exposed at the surface of an insulating base.

Further features and objects of the invention will be more apparent to those skilled in the art upon a consideration of the accompanying drawings and following specification wherein is disclosed a single embodiment of the apparatus necessary for carrying out the invention, with the understanding that such changes may be made therein as fall within the scope of the appended claims without departing from the spirit of the invention.

In said drawings illustrating a preferred embodiment of the invention:

Figure 1 is a view of the apparatus in its housing shown suspended from a parachute as on descent from a flight;

Figure 2 is an elevation of the radiosonde with the vacuum tube side exposed by removal of the front cover, with certain parts shown in section;

Figure 3 is an elevation of the opposite or clock side of the apparatus with the rear cover removed;

Figure 4 is a horizontal section taken on a plane corresponding to line 4—4 of Figure 2 and illustrating the housing and supporting arrangement as well as the disposition of the several parts;

Figure 5 is a vertical section taken on a plane corresponding to line 5—5 of Figure 2 and looking in the direction of the arrow;

Figure 6 is a wiring and schematic diagram of the radio circuit and keying means therefor; and Figure 7 is an enlarged elevation partly in longitudinal section of a contact cylinder forming a portion of the apparatus and showing the manner of exposing the helical conducting strip through the insulating surface thereof.

It has already been proposed to ascertain meteorological conditions at varying distances above the earth's surface by sending up appropriate measuring instruments on an aeroplane or free balloon and making direct recordings on a tape or the like in the apparatus of the instantaneous readings of the several instruments, in respect to time, if desired. The use of aeroplanes, however, is extremely expensive and is limited to heights of only a few thousand feet as well as restricted by weather conditions which at times make it unsafe or undesirable to fly. Similar apparatus for use on free balloons has but limited application because of the difficulty of retrieving the equipment in order to ascertain the readings. Both of these plans are also undesirable since the readings are not available until the apparatus is brought back to earth. It has therefore been proposed and apparatus has been constructed and used which mounts the several meteorological instruments on a free balloon and causes them to actuate radio transmitting equipment of one sort or another to send out at frequent intervals the readings of the several instruments. The records can then be made at one or more receiving stations near the origin of the flight and are instantly available as taken.

One of the main considerations in this last form of apparatus is cheapness, since recovery of the equipment is at best problematical particularly along the several coasts on the occasions of off-shore winds. Along with the requirement for cheapness of equipment is the necessity for extremely light weight in order to reduce the size of the balloon necessary for lifting the equipment and the size of the parachute usually provided for returning it to earth in the hope that it may be recovered. The termination of upward flight is effected by explosion of the balloon due to decreased external pressure in the rarefied atmosphere.

Apparatus which complies with the first two requirements of cheapness and lightness must not sacrifice on that account its ability to take accurate readings to maintain accuracy throughout a wide range of atmospheric temperatures and pressures and humidities and to transmit signals of receivable intensity at the greatest distance of flight from the point of departure. It has been determined by careful observations that maximum elevations of about 20 kilometers are desirable and under most conditions it is found that the balloons seldom travel more than 150 kilometers before reaching this elevation since the ascent is fairly rapid in the absence of unusual conditions and is found to average approximately 200 meters per minute.

One of the requirements of the radio transmitter in the radiosonde is that it shall produce, at the receiving station, preferably at the point of departure of the balloon, a field strength of sufficient intensity to actuate the receiver-recorder under all conditions within the limits of distance covered by the radiosonde. At a height of 20 kilometers and at a horizontal distance of 150 kilometers the angle of elevation to the balloon would be approximately 6 degrees but the effect of refraction will increase this so that under ordinary conditions the signal will always be a direct one, that is via an optical path to the receiving antenna. Therefore, after having computed the field strength necessary at the receiving antenna it is a relatively simple matter to ascertain, by known formulae, the amount of energy which must be radiated by the transmitter and to construct a transmitter capable of delivering this energy to the receiver under the worst possible weather conditions, and of low instrument temperatures and batteries enfeebled by use and cold. It has been found that good results are obtained at any operating frequency, and that the antenna may be relatively short. It is customary to use the antenna as the means for suspending the apparatus from the parachute. Furthermore, short-wave radio equipment is simpler and lighter in weight but conversely is more subject to variations in frequency in accordance with temperature changes of the parts of the circuit. Oscillation of the transmitting tube cannot be maintained when battery voltages fall below certain minimum requirements.

The difficulties caused by temperature changes in the radio equipment, i. e. changes in frequency and reduction in battery voltage and efficiency call for some satisfactory means for preventing the temperatures within the radiosonde from reaching the extremely low atmospheric temperatures prevailing at the maximum heights of flight. Since the time of flight in the low temperature region is seldom much greater than one hour, this can be achieved by simple means later to be described which are also found to be of great advantage in other respects. For instance, the clock or motor mechanism, forming a part of the apparatus, can be much simpler and cheaper in construction and yet maintain a relatively close time control if it is not subjected to too great a temperature change during the flight. Furthermore, if the barometric equipment is maintained within a reasonable range of temperature it can be made simpler and cheaper and not require either compensation or correction for temperature changes.

Figure 1 illustrates a radiosonde suspended from a parachute, the housing for the apparatus being illustrated at 10, the suspending antenna at 11, and the parachute at 12. During the ascent the parachute is suspended in a collapsed condition at the point 14 from a suitable balloon, not shown, like an enlarged toy balloon formed of a single piece of thin rubber appropriately inflated with hydrogen or helium and having a capacity to lift the apparatus to an elevation of about 20 kilometers under any barometric pressure which might exist at that elevation. The strength of the fabric of the balloon and the quantity of gas with which it is inflated are so correlated that the balloon will burst at approximately 20 kilometers and release the apparatus, whereupon the parachute opens and retards its fall to earth at a rate sufficient to prevent serious damage to the equipment on landing.

Only the apparatus in and adjacent the housing 10 forms any part of the present invention and the remainder of the description will be restricted thereto.

Various forms of material suggest themselves for the housing but since lightness of weight and high thermal insulation are desirable, together with rigidity and ease of manufacture, balsa wood or preformed papier mâché with a light heat insulating lining has been selected as extremely satisfactory and for the purpose of the present invention is formed into a closed rectangular box divided on a vertical median plane into two identical parts 10A, hereinafter termed the front, and 10B, hereinafter termed the back. The exposed edges of these two parts are adapted respectively to abut against and clamp between them the thin base plate 16 upon which is supported all of the apparatus hereinafter to be described. This plate is formed of some suitable plastic insulating material which preserves its shape and size well under varying temperature and humidity conditions, of a thickness of approximately one-eighth of an inch. This plate carries the several meteorological instruments, clock, radio tube, coils, batteries, and the like, as will hereinafter be described. The main portion of the base plate 16 is of the same size and configuration as the front elevation of the box so that its edges are flush with the top, bottom, and sides of the housing except for a flange portion 16F which projects a short distance out from one side of the box, extends vertically thereof and forms a mounting flange for the metallic chimney 18 and the inner metallic flue 19 within which is housed the thermal responsive element 20 and the hygrometer element 21, these being the only parts of the equipment outside of the protection of the wooden box or housing.

To enhance the effect of the insulating properties of the balsa wood to maintain the temperature within the compartment as nearly uniform as possible, resort is made to carrying a quantity of water within the compartment. The quantity is carefully ascertained to maintain the weight as low as possible, and the temperature fixing characteristics as high as possible. The operation of this material depends upon the high specific heat of water and the high latent heat of fusion thereof. The water will be assumed to be at approximately atmospheric temperature at ground level when the balloon is released and as the balloon ascends the temperature outside of the box lowers rapidly with increased elevation. The water continues to give off heat at a rate dependent upon the difference between its temperature and that within the box until the freezing point is reached and at that time the considerable latent heat of fusion is given off until all of the water is frozen, holding the temperature within the box uniform and not substantially below freezing. If the quantity of water is sufficient, this temperature will be maintained until the balloon has reached its zenith but if it is not, the temperature within the box will fall after all water is frozen more rapidly than before freezing because of the greater existing differential, the outside temperature having fallen rapidly while that inside the box was maintained at freezing.

As a convenient container for the water, a pair of rubber bags 25, each of a dimension equivalent to the inside area of a side wall of the compartment and of extreme thinness, is provided and each is maintained in position against its respective wall by a thin plate of metal 26 having the down-turned side flanges 27 of a width substantially equivalent to the thickness of the filled bag. Each rubber bag is incompletely filled to provide space for expansion on freezing.

The metal cover plate aside from serving mechanically to support the limp rubber bag acts as a reflector of heat serving to maintain the heat originally within the compartment from being conducted out of the same through the walls of the box. Being in close contact with the rubber of the water bag, it serves as a conductor of the heat from the water during the time that the temperature outside is being lowered and prior to the freezing of the water. After the water is frozen it serves as a reflector to keep in the heat already within the apparatus.

Mounted on the front face of the panel (16) is a radio tube 31 of the usual receiving type known as the "30" which is used because of its cheapness and small size. It is debased for lightness and supported by having its base end fitted in a large central opening in a piece of insulating sheet 32 mounted at right angles to the sub-base. The upper end of the tube is held against the sub-base by an elastic band 33 attached to hooks spaced apart on the sub-base a distance about equal to the diameter of the tube. This provides a light and flexible mounting. The remaining elements of the radio circuit, except batteries, are mounted on this insulating sheet 32. The plate and grid coils appear at 34, 36 on the side of this member opposite the tube. They are wound with copper wire plated to prevent circuit changes due to corrosion. The plate and grid coils are connected to the proper elements within the tube and together with a small fixed condenser and appropriate resistance form the transmitting circuit, a choke coil 37 is included to increase the efficiency of the transmitter by preventing any of the radio frequency energy developed by the transmitter from being wasted in the external circuit. A small fixed condenser 38 is likewise mounted on the sheet 32.

On the back face of the sub-panel immediately behind the tube are mounted the batteries. As seen in Figures 3 and 5 the filament or A battery comprises a pair of flashlight cells 40 mounted between contact clips 41 and 42 and positioned against lateral movement by a clamp 43. The anode or so-called B battery 45 is held by clamps 46 and 47 and engages with contact clips 48 and 49. All of these contact clips and clamps are appropriately riveted to the sub-panel and where necessary for the purposes of electrical connection are attached to wires, straps, or other conductors on the same or the opposite face of the sub-panel. One of the contacts, 42, is connected to the plate 50 on the opposite side of the panel which mounts a spring 51 acting as one blade of a switch, the other being seen at 52. A plunger of insulating rod 53, slidable in brackets 54, is engageable with the spring 51 to press it down upon the plate 52 to close the filament circuit when it is desired to start the transmitter in operation before releasing the balloon. The end of the rod 53 is accessible from outside of the case to put the transmitter in operation.

The elements of the radio circuit are seen in diagrammatic form in Figure 6. The circuit is of a positive grid version of the inductive feedback variety of oscillator with the tube 31 having its filament 55 excited from the A battery 40 through the switch 51, 52. The grid 56 is shown as connected to one end of the grid coil 36 and the plate 57 to one end of the plate coil 34. These coils are mounted with their axis in the same plane and are in close proximity, their adjacent ends being connected through condenser 38 shunted by resistor 39. For the sake of lightness and simplicity these coils are adjusted to exact size requisite for the transmission frequency selected and do not need tuning condensers. The antenna 11 is connected to an intermediate point on the plate coil as shown. The plate is excited from the B battery 45 connected between the plate coil and the filament return. Interposed in the return circuit is a contactor system 60 variously under control of the several meteorological elements, the clock, and a contactor, all of which will be described later. For the present it is sufficient to say that the anode circuit is closed once for each revolution of the clock driven contactor element 61, for each instrument, and for a timing or reference contact. The transmitter, therefore, is not continuously in operation, the B battery being in use only when the circuit is closed at one of the contacts shown. The B battery can, therefore, be of extremely small size and capacity and even under these conditions its life is longer than that of the A battery which is continuously in operation during the flight.

The third meteorological instrument is mounted inside of the casing, above and on the same side of the panel 16 as the radio tube. It is the aneroid barometer 65 as seen in Figures 2, 4, and 5. The barometer is arranged inside of the housing not only for mechanical protection but to simplify its construction. If it is not subject to the tremendous temperature changes which occur on the outside of the housing it can be of a cheaper construction without the need for costly temperature compensating means and yet its recordings will be sufficiently accurate so that under ordinary circumstances no variable temperature corrections will have to be applied to the record.

The means for keying the radio circuit in accordance with the instantaneous setting of each of the instruments and for transmitting a timing or reference signal substantially in synchronism with the operation of the receiving recorder includes a clock 66 and the contactor element 61, previously referred to and driven by the clock preferably at four revolutions per minute. This contactor element is preferably an insulated cylinder 67 having on its surface and preferably flush therewith a conducting helix 68 of one or more turns. The surface of this cylinder is swept over longitudinally by three non-interfering contact pointers actuated respectively by the three meteorological instruments, and a fixed pointer 69, which may if desired have a forked or double end, makes contact with the helix once per revolution for the purpose of sending out a readily identifiable timing or reference signal.

If reference signals are desired that follow one another in very quick succession the reference pointer will play on a portion of the helix cylinder that has a bigger diameter; or the reference pointer will sweep a contacting disk appropriately connected into the gear train. Or the pointer will turn with the helix, sweeping over fixed contacts in a stationary circle.

The clock 66 is a sturdy mechanism of standard construction, considerable power, and low cost. It may be part of the timing mechanism of a conventional alarm clock and is mounted on the rear face of the sub-panel 29 just above the radio batteries. The contact cylinder with its helix is driven from one of the gears of the clock by being mounted on an extension of the shaft thereof which passes through the sub-panel and preferably through the cylinder. The clock may be wound by the usual key mechanism which can be applied when desired to the winding stem 70. The clock is constructed to operate for about two and a half hours at one winding with no change in its rate greater than 0.1%. Being inside of the housing it is well protected from substantial temperature changes. During the manufacture it is carefully cleaned of any oil which may become too viscous at low temperatures to permit proper operation and any parts needing lubrication are dry-graphited. Such a construction shows less than 1.0% error on temperature changes from 80 degrees F. to —85 degrees F. One end of the helix is electrically connected in any suitable manner to the shaft on which it is mounted or by means of a special sweeping brush so that electrical connection can be made thereto through the clock frame. The fixed pointer 69 and the several instrument operated pointers are all connected together electrically in the manner illustrated in Figure 6. It will be seen that the amount of longitudinal displacement of any movable pointer from the fixed pointer will be measured by the elapsed time interval between the engagement of the helix with the fixed pointer and the engagement thereof with the movable pointer, and this time interval will be a measure of the setting of the instrument actuating said pointer. The interval between signals sent out by the contacting of these pointers with the helix will therefore indicate at the receiving end the instantaneous setting of the instrument. The same will hold true of each of the other instruments.

If a single-turn helix is used each of the several instrument pointers will engage it subsequent to the engagement by the fixed pointer. Being positioned angularly about the cylinder they can pass each other and may at time have the same longitudinal displacement but they will never engage the helix at the same time when at that same displacement because of their angular displacement. It is, however, possible for them to be so longitudinally displaced relative to each other that simultaneous contact will be made by two of them but this need cause no harm since the record traces on the paper tape at the receiving end will show a dotted line for each instrument as well as the timing contact. These dotted lines will be differently curved due to the different rates of change of temperature, humidity, and barometric pressure with increase in elevation of the instrument and may at times coincide or even cross each other. For the sake of increased accuracy it is sometimes desirable to have several turns to the contact helix which, adds no complications to the receiving equipment.

The temperature responsive element 20 consists of a bi-metallic spiral, the outer end being supported by a sturdy wire post 71 from the inner flue 19 and the reinforcing bracket 72 on the outside of the same which is secured at 73 to the extension of the insulating plate to ensure rigidity of mounting for the thermal element. The center of the helix is tangentially attached to the relatively flexible, rotatable shaft 74 which passes through a groove in the insulating panel and is supported in bearings 75, 76 attached thereto. Mounted radially on this shaft in any appropriate manner is the thin metal contact pointer 77 best seen in Figure 2 arranged to engage the contact helix 61. Preliminary adjustment of the setting of the thermal element pointer may be effected by judicious bending of the supporting post 71 or by corresponding bending of the pointer.

The hygrometer is, as previously stated, operated by the expansion and contraction of a hair 21 which is anchored at 78 to a threaded post mounted in the edge of the flange 16F on the insulating panel. This post is rotatable for adjustment of the tension and setting of the hygrometer. The opposite end of the hair is attached to the end of an arm 79 extending radially from a shaft 80 pivoted at 81 and 82 and operating in a groove in the insulation panel. It has attached to it a contact pointer 83 having the hooked end 84 which bears on the surface of the contact cylinder 61 in a manner similar to that of the thermal element pointer 77. The shaft 80 is biased in a direction to tension the hair 21 by means of a feeble helical spring 85 having its inner end attached to the shaft and the outer end to the insulation panel. This provides restoring force for the shaft and pointer when the hair expands.

The barometric element comprising a single cell or a plurality of evacuated capsules 86 centrally connected together in series is supported from a triangular aluminum plate 87 spaced from the insulating panel 16 by two fixed posts 88 at two apices of the triangle, while at the third apex an adjustable post 89 provides means for regulating the spacing of the capsules toward or away from the insulating base plate. As seen in Figure 2 the center of the upper capsule is bolted to the aluminum plate 87 and the bolt passes through a slot 90 in which it is slidable for lateral adjustment, the purpose of which will be apparent as the description of this device proceeds.

Looking now at Figure 4, it will be seen that the third movable pointer and the one associated with the barometric device is illustrated at 91 and is pivoted for rotation with a shaft 92 supported in appropriate bearings and biased by a hair spring 93 in a counterclockwise direction as viewed in that figure. The inner or lower capsule 86 has depending from its center a metal plate 95 whose plane is at right angles to the plane of swinging of the pointer 91, which plate bears on the surface of the pointer and as the capsules expand with decreased barometric pressure moves the pointer in a clockwise direction. Contraction of the capsules on increased barometric pressure withdraws the plate 95 but the pointer is constrained to follow it by its return spring 93. Adjustment of the capsules by sliding their locking post in the slot 90 changes the lever arm and hence the range of the pointer under the action of the barometric pressure changes, whereas adjustment of the post 89 effects the initial setting where desired on the length of the contact cylinder.

No effort has been made to specifically point out herein the exact arrangement and construction of the electrical connections between the several parts of the apparatus since the wiring diagram of Figure 6 illustrates completely the circuit of the radio apparatus and the manner of keying the same. No particular novelty is involved in the actual mechanical means for mounting the various wires, straps, rivets, and the like which serve to provide the simplified and sturdy electrical connections in the commercial form of the device. They have merely been laid out to provide for simplicity and ease of assembly.

It will be noted that the actuating contact pointer for each of the meteorological instruments rotates about a fixed axis, that all of the pointers are of substantially the same length, and that all of the axes of rotation are in substantially the same plane, parallel to the base plate. This ensures that the contact tip of each contact pointer moves in a similar path over the surface of the contact cylinder. This path is a complex curve defining the intersection of a large cylinder and a small cylinder whose axes are at right angles to each other, but once it has been figured as to shape, the necessity for individual calculations for each apparatus is removed and calibration is simplified.

In testing and calibrating the equipment prior to use, the barometer can be simply calibrated in a variable vacuum chamber. Because of the difficulty of testing the thermal element at various temperatures using low temperature air, it is conveniently arranged on the outside of the compartment in such a manner that it can be dipped in a liquid, which provides a much more satisfactory temperature testing medium, without immersing any other portion of the equipment, it being noted that the hygrometer hair is closer to the main casing than the thermal element. This hygrometer hair can be simply tested by passing air of various humidities through the stack.

It will be readily appreciated that the cylinder and contact helix arrangement can be replaced by a rotatable disk having a spiral contact on one face thereof. It would only necessitate a rearrangement of the axes of the several contact pointers to cooperate therewith.

The construction of either the disk and spiral or cylinder and helix presents a difficult problem, first because of the necessity of manufacturing the devices at low cost, and second because of the delicacy of the whole apparatus. The surface of the contact helix should be substantially coincident and continuous with that of the insulating cylinder in order that there be nothing to catch and move the delicately mounted pointers and thus disturb their accuracy. Resort has been had to threading the cylinder and embedding a flat wire therein, but this has proven too costly for production manufacture and it is preferred to form the contact device by coating a disk or cylinder of conducting material, such as copper, brass, or the like, with an extremely thin but tough layer of insulating substance, such as a lacquer, of the type which can be applied by dipping, spraying, brushing, or otherwise spreading over the surface. The layer should be somewhat of the nature of the insulating enamel used on copper magnet wire and should have a thickness less than one thousandth of an inch. The appropriate spiral or helix of metal from the base cylinder is then exposed by removing the necessary portion of the insulating coating.

In Figure 7 there is illustrated a simple method for doing this. A metal tube is shown at 100 provided with heads 101 to adapt it for mounting on the shaft 102, and the thin insulating coating is shown at 103. By properly supporting the shaft and rotating the same at a uniform speed, the helix may be formed by the use of a heated tool 104 moved longitudinally at the proper rate of speed to provide the desired number of turns. This tool melts through the insulation and provides an extremely smooth junction between the metal and insulation which ensures against any catching of the contact pointers when in operation. The results are much superior to those effected by cutting or otherwise endeavoring to remove the insulation since these operations result in burrs and similar inequalities rendering the device unsatisfactory.

It will be appreciated that in particular the flat spiral contact device might be made by a photoelectric process similar to the process used for etching zinc or aluminum plates in photo-lithographing.

The radiosonde as illustrated has been actually constructed to weigh not more than twelve ounces complete and ready for ascension but it is not deemed essential to refine the equipment to the degree necessary to attain this lightness since the United States Weather Bureau is satisfied with the specification weight of not greater than thirty-two ounces. Refinement beyond this figure increases the cost without added compensation in the reduction of the price of the parachute and balloon.

Having thus described the invention, what is claimed as new and desired to be secured by Letters Patent is:

1. In a radiosonde of the type provided with a plurality of meteorological instruments, a clock, a radio transmitter, batteries and contact means for causing transmission of signals corresponding to the timed readings of the instruments, the combination with a heat insulating housing for substantially all of said equipment, of a flexible bag in said housing containing a quantity of water and rigid heat reflecting means maintaining said bag in position against an inner wall of said housing.

2. A radiosonde including in combination, apparatus best suited for operation at temperatures not substantially below freezing but subject to much lower temperatures, a heat insulating housing for said apparatus, a container in said housing partially filled with such a quantity of water that it will not all freeze much before the termination of a flight in order to be available to radiate heat into the casing.

3. A radiosonde including in combination, apparatus best suited for operation at temperatures not substantially below freezing but subject to much lower temperatures, a heat insulating housing for said apparatus, a flexible container in said housing partially filled with such a quantity of water that it will not all freeze much before the termination of a flight in order to be available to radiate heat into the casing, said bag substantially covering one inner wall of the housing, and a rigid, heat conducting reflector in contact with said bag on the side thereof facing the inside of the housing.

4. In a radiosonde of the type described, in combination, a panel of insulation, instruments, a radio transmitter and batteries mounted on both faces of said panel, leaving the border free, and a housing of heat insulation comprising two open face box-like parts each of the same outline as said panel and adapted to engage said border and house the material on one face thereof.

5. In a radiosonde of the type described, in combination, a panel of insulation, instruments, a radio transmitter and batteries mounted on both faces of said panel, leaving the border free, a housing of heat insulation comprising two open face box-like parts each of the same outline as said panel and adapted to engage said border and house the material on one face thereof, an extension from one edge of said panel beyond the housing, a stack carried by said extension and a meteorological instrument in said stack and supported by said extension.

6. In a radiosonde having a radio transmitter, means for keying the transmitter comprising a constantly rotatably driven curved line contact, a plurality of pivoted contact pointers adapted to range over the area swept by said contact to engage it at different positions in its rotation in accordance with their settings, a meteorological instrument adapted to actuate each pointer, at least one of said instruments having means to adjust the rate of movement of its pointer contact in respect to the rate of movement of the actuating element therefor, and further means to adjust the initial position of the pointer in respect to the line contact.

7. In a radiosonde having a radio ransmitter, means for keying the transmitter comprising a constantly rotatably driven curved line contact, a plurality of pivoted contact pointers adapted to range over the area swept by said contact to engage it at different positions in its rotation in accordance with their settings, a meteorological instrument adapted to actuate each of said pointers, a fixed pointer, one of said instrument pointers having a fixed axis of rotation, a spring biasing said pointer in one direction, the meteorologcal instrument for said pointer having a part engaging the same intermediate its length to move it in opposition to said bias, means to adjust said instrument toward or from said pointer, and means to adjust the same longitudinally of said pointer.

8. In a radiosonde, in combination, a panel of insulation, a radio transmitter and barometer mounted on one face of said panel, batteries and a clock mounted on the opposite face of the panel, a contact mechanism including an insulating base and curved line contact mounted adjacent said barometer and driven at constant rotative speed by said clock, a fixed pointer on said panel adapted to contact said line contact once per revolution thereof, a contact pointer actuated by said barometer and adapted to range over the area swept by said line contact to engage the same once per revolution at an interval subsequent to engagement by the fixed pointer indicative of the barometer reading, and a heat insulating casing engaging said panel and enclosing all of said apparatus.

9. In a radiosonde, in combination, a panel of insulation, a radio transmitter and barometer mounted on one face of said panel, batteries and a clock mounted on the opposite face of the panel, a contact mechanism including an insulating base and curved line contact mounted adjacent said barometer and driven at constant rotative speed by said clock, a fixed pointer on said panel adapted to contact said line contact once per revolution thereof, a contact pointer actuated by said barometer and adapted to range over the area swept by said line contact to engage the same once per revolution at an interval subsequent to engagement by the fixed pointer indicative of the barometer reading, a heat insulating casing engaging said panel and enclosing all of said apparatus, a thermal responsive element and a humidity responsive element supported from the edge of said panel and outside of said casing, pointers within the casing for cooperation with said line contact, and means extending through the casing wall and rotatably connecting the pointers and outside instruments.

KARL O. LANGE.